(12) United States Patent (10) Patent No.: US 8,608,318 B2
Sugiyama et al. (45) Date of Patent: Dec. 17, 2013

(54) WIRELESS PROJECTOR APPARATUS AND WIRELESS LAN ADAPTER

(75) Inventors: Norimitsu Sugiyama, Osaka (JP); Junji Masumoto, Osaka (JP); Atsushi Nakamizo, Osaka (JP)

(73) Assignee: Panasonic Corporation, Osaka (JP)

( * ) Notice: Subject to any disclaimer, the term of this patent is extended or adjusted under 35 U.S.C. 154(b) by 461 days.

(21) Appl. No.: 12/939,564

(22) Filed: Nov. 4, 2010

(65) Prior Publication Data

US 2011/0115689 A1    May 19, 2011

(30) Foreign Application Priority Data

Nov. 13, 2009 (JP) ................................. 2009-259628
Dec. 10, 2009 (JP) ................................. 2009-280272

(51) Int. Cl.
*G09G 5/00* (2006.01)

(52) U.S. Cl.
USPC ................ 353/94; 353/121; 725/81; 345/2.3; 455/3.01

(58) Field of Classification Search
USPC .................. 353/94, 121, 122; 709/74, 78, 81; 455/3.01, 3.06; 345/2.3
See application file for complete search history.

(56) References Cited

U.S. PATENT DOCUMENTS

| 7,118,220 | B2 * | 10/2006 | Castaldi et al. | 353/30 |
| 8,403,506 | B2 * | 3/2013 | Suzuki | 353/121 |
| 2005/0192056 | A1 | 9/2005 | Karaki | |
| 2012/0019435 | A1 * | 1/2012 | Hashimoto et al. | 345/2.3 |
| 2013/0057591 | A1 * | 3/2013 | Sugiyama | 345/671 |

FOREIGN PATENT DOCUMENTS

| JP | 2004104474 A | 4/2004 |
| JP | 2004166126 A | 6/2004 |
| JP | 2005269612 A | 9/2005 |
| JP | 2005-277815 A | 10/2005 |
| JP | 2005-284953 A | 10/2005 |
| JP | 2006-93926 A | 4/2006 |
| JP | 2006-270614 A | 10/2006 |
| JP | 2007-6106 A | 1/2007 |
| JP | 2008072402 A | 3/2008 |
| JP | 2008090561 A | 4/2008 |
| JP | 2008165007 A | 7/2008 |
| JP | 2008-271265 A | 11/2008 |
| TW | 200723869 A | 12/1994 |
| WO | WO 2005/088908 A1 | 9/2005 |
| WO | WO-2008041591 A1 | 4/2008 |

OTHER PUBLICATIONS

Japanese Application Serial No. 2009-259628, Office Action Dated Sep. 27, 2011, 2 pgs.

* cited by examiner

*Primary Examiner* — William C Dowling
(74) *Attorney, Agent, or Firm* — RatnerPrestia

(57) ABSTRACT

A wireless LAN adaptor includes an auto-run program for a connection process, containing a projector identifier for specifying a connection destination. In the process while this auto-run program is executed, an electric field intensity measuring unit measures the electric field intensity of a response radio wave from the wireless projector. The control unit interrupts connection operation and makes the display unit of the PC produce a display for requesting judgment when the electric field intensity is smaller than a predetermined value.

5 Claims, 8 Drawing Sheets

FIG. 8

| ch | SSID | Electric field intensity |
|---|---|---|
| 1 | Panasonic Display4 | -90dB |
| 2 | — | |
| ... | — | |
| 10 | — | |
| 11 | Panasonic Display4 | -60dB |

WIRELESS PROJECTOR APPARATUS AND WIRELESS LAN ADAPTER

TECHNICAL FIELD

The present invention relates to a projector apparatus that projects an image stored in an information-processing apparatus (e.g. a personal computer) on a screen through a wireless network as a transmission line, and to a technique for reliably connecting the information-processing apparatus to a projector.

BACKGROUND ART

In recent years, wireless projectors have become widely used where an image displayed on an information-processing apparatus such as a personal computer (also abbreviated simply as PC, hereinafter) and a digital camera is transferred through a wireless network (particularly wireless LAN) using radio waves, not through a cable such as a RGB cable and USB cable, and the image is projected on a screen.

This situation is against the following background. That is, with the extensive spread of information-processing apparatus such as a notebook PC with high portability and a digital camera, the demand is growing for easily connecting an information-processing apparatus carried while moving around in a room to a projector placed on the spot. Further, compared to conventional cable connection, the degree of flexibility significantly increases in the installation location of a projector and an information-processing apparatus. For example, a projector placed at a remote location (e.g. the ceiling of a meeting room) can be easily connected.

To use a wireless network, a wireless LAN adaptor as hardware is required, and its driver and a software program for specifying a communication target (i.e. projector) need to be installed in the information-processing apparatus.

To install a program in a PC, a CD-ROM attached with the hardware device needs to be inserted into the CD-ROM drive of the PC for installing the device driver and setting programs.

This installation work is troublesome and requires an external CD-ROM drive separately for a PC without a CD-ROM drive. Examples of how to simplify such a troublesome operation include those described in patent literatures 1 and 2.

Patent literature 1 describes the following way. That is, a wireless LAN adaptor (usually called a dongle) has a function of being recognized as a keyboard when connected to a USB terminal of a PC, and allows any file in the wireless LAN adaptor to be loaded on the PC for execution. After that, the keyboard function is changed to the wireless LAN adaptor function for being used as a regular wireless LAN adaptor.

Patent literature 2 describes an information-processing apparatus (a projector-supporting peripheral device in the literature) such as a digital camera that searches only for company's own-brand projectors through a wireless LAN and selects one to be connected from them. The apparatus, when the search button is pressed, searches for projectors having an SSID (service set identifier) specific to a company's own-brand projector, and indicates respective connection states (state of connection and disconnection to and from another device) using a combination of the number of light-emitting LEDs and their emission colors. When the user presses the select button, the apparatus establishes connection with a desired wireless projector.

A projector is fixedly installed in a room of a building. Particularly in such as an office, more than one projectors are installed. In this case, a projector is used by specified or unspecified people, and thus a projector unique to a room needs to be easily connected with their PCs. This condition can be satisfied if a dongle-type wireless LAN adaptor is issued or lent to a user as a wireless LAN adaptor dedicated to the projector.

A dongle-type wireless LAN adaptor, however, is small and lightweight enough to be carried so easily, and thus a user may accidentally use an adaptor for a projector different from a desired one. In such a case, a PC cannot be connected to a desired projector. If a projector corresponding to the wrong adaptor is placed in such as a next room, the PC ends up being connected to the projector, which may cause a large problem in information security.

If only one projector with the same SSID is present in a range where wireless communication with a PC is possible (a range that radio waves reach), the PC can detect a desired projector to connect to the projector reliably. Meanwhile, if plural projectors with the same SSID are present and they belong to network groups with different wireless channels (also referred to simply as channel, hereinafter), the PC cannot detect a projector to be connected. That is, by the conventional search method, an SSID is set to a PC, and the PC scans channels in a predetermined order to search for a projector connected to the same network group. Then, the PC communicates with a projector detected for the first time; checks if the projector is one to be connected; and stops the search at the point if the projector is not one to be connected. Consequently, even if a projector to be connected is present in the same network group, the PC is unable to connect to the projector.

PRIOR ART DOCUMENTS

Patent Literature

[Patent literature 1] Japanese Patent Unexamined Publication No. 2005-284953

[Patent literature 2] Japanese Patent Unexamined Publication No. 2008-271265

SUMMARY OF THE INVENTION

A wireless projector apparatus of the present invention includes a wireless projector capable of connecting to a wireless network; and a wireless LAN adaptor containing identifier information unique to the wireless projector, connecting to the wireless projector by connecting to a USB terminal of an information-processing apparatus. The wireless LAN adaptor includes an auto-run program that makes the information-processing apparatus connect to a wireless projector having unique identifier information when the LAN adaptor is connected to the information-processing apparatus; and an electric field intensity measuring unit measuring the electric field intensity of a received radio wave. The LAN adaptor controls connection between the information-processing apparatus and the wireless projector on the basis of the electric field intensity measured by the measuring unit.

Such a configuration provides a wireless projector apparatus that prevents improper connection. For example, even if a wireless LAN adaptor for a wireless projector placed in a next room is accidentally connected to an information-processing apparatus, this situation can be noticed before an image appears. Meanwhile, even if plural wireless projectors with the same SSID belong to network groups with different channels, an information-processing apparatus such as a PC can be reliably connected to an intended wireless projector.

A wireless LAN adaptor of the present invention contains identifier information unique to a wireless projector to be connected and connects to the wireless projector by connecting to a USB terminal of an information-processing apparatus. The wireless LAN adaptor includes an auto-run program that makes the information-processing apparatus connect to a wireless projector having the unique identifier information when the LAN adaptor is connected to the information-processing apparatus; and an electric field intensity measuring unit measuring the electric field intensity of a received radio wave. The LAN adaptor measures the electric field intensity of a response radio wave from the wireless projector having the unique identifier, and makes the display unit of the information-processing apparatus produce a display for requesting judgment whether or not connection is made to the wireless projector with the unique identifier when the intensity is smaller than a predetermined value.

BRIEF DESCRIPTION OF DRAWINGS

FIG. 8 shows an example SSID list according to the second embodiment.

DETAILED DESCRIPTION OF PREFERRED EMBODIMENTS

Hereinafter, a description is made of some embodiments of the present invention with reference to the related drawings.

First Exemplary Embodiment

Figure 1:
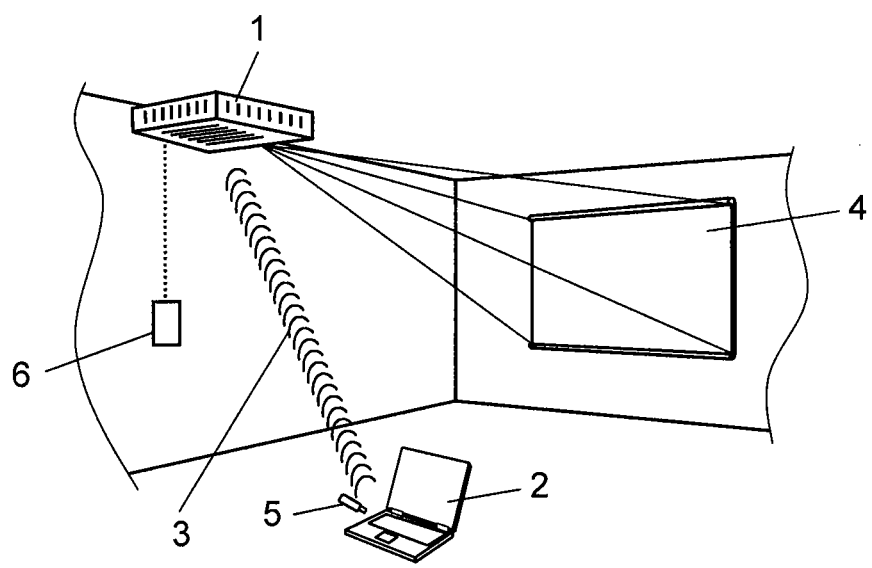
FIG. 1 shows an appearance of a wireless projector apparatus according to an embodiment of the present invention.

FIG. 1 shows an appearance of a wireless projector apparatus according to the embodiment.

Wireless projector 1 obtains information such as a presentation document from PC 2 (information-processing apparatus, e.g. notebook PC) through radio wave 3, and projects related images onto screen 4. Wireless LAN adaptor 5 with the structure called a USB dongle is connected to a USB terminal of PC 2 for use. Wireless projector 1 is a liquid crystal projector with a wireless LAN function built-in, for example. The power to wireless projector 1 is turned off from operation unit 6.

Figure 2:
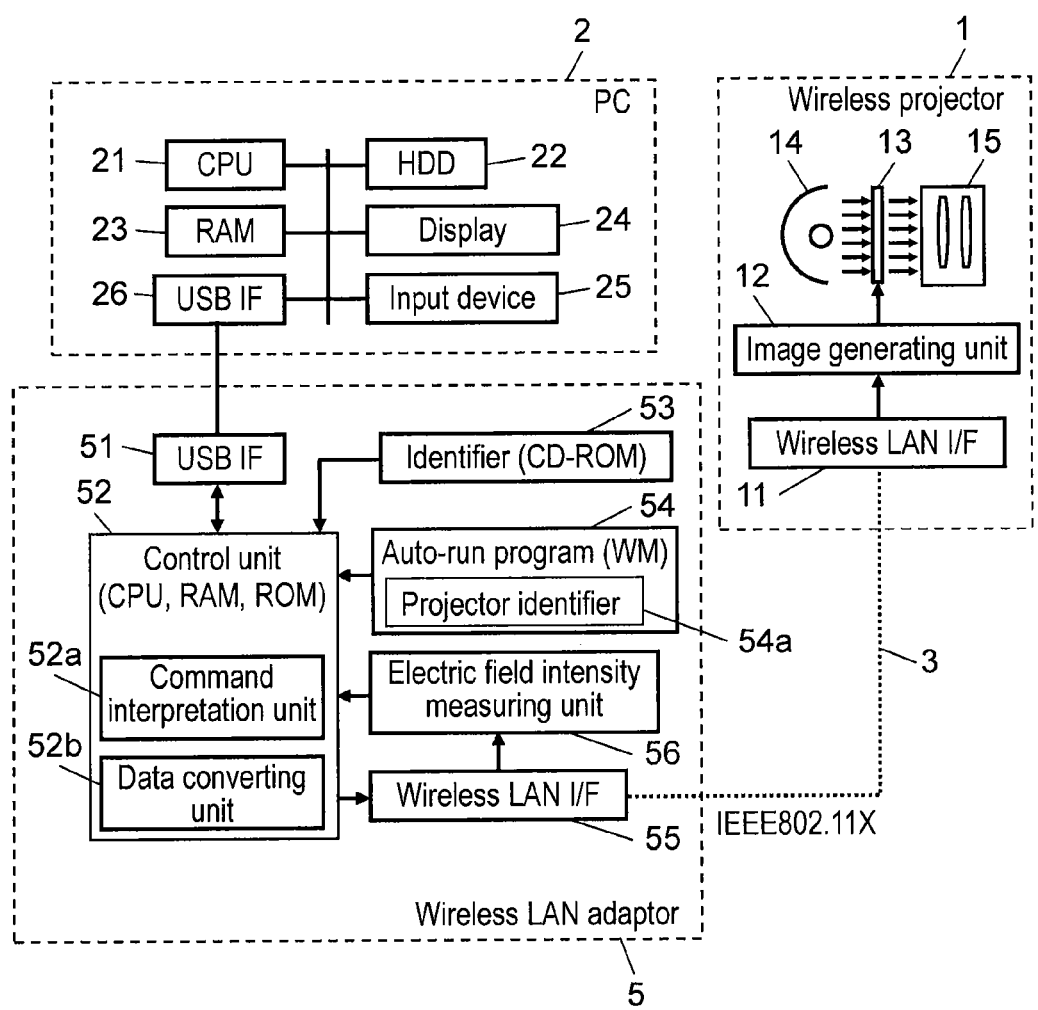
FIG. 2 is a block diagram illustrating an electrical configuration of the wireless projector apparatus.

FIG. 2 is a block diagram illustrating an electrical configuration of a wireless projector apparatus according to the embodiment.

The wireless projector apparatus is composed of wireless projector 1 and wireless LAN adaptor 5 with the structure of a USB dongle as an accessory of the projector.

PC 2 typically includes CPU 21 (i.e. controller) as the core; HDD (hard disk drive) 22; RAM (random access memory) 23 as the main memory; display 24 as a display unit; input device 25 such as a keyboard and mouse; and USB_IF (interface) 26.

Wireless LAN adaptor 5 is composed of USB_IF 51 used for communicating with PC 2; control unit 52, identifier 53, auto-run program 54, wireless LAN_IF (wireless LAN interface) 55, and electric field intensity measuring unit 56.

Control unit 52 is composed of a CPU, RAM, ROM, and other components. Control unit 52 includes command interpretation unit 52a that mediates with PC 2 in communication and interprets a command (referred to as a SCSI command) defined by the SCSI (Small Computer System Interface) standard, transmitted from PC 2; and data converting unit 52b that converts data received (referred to as SCSI data) defined by the SCSI standard, to TCP/IP data, and outputs the resulting data to wireless LAN_IF 55. Identifier 53 is for making PC 2 recognize wireless LAN adaptor 5 as a CD-ROM drive. This action dispenses with installing a driver dedicated to wireless LAN adaptor 5 into PC 2, and allows access even by user authority. Further, since wireless LAN adaptor 5 is recognized as a CD-ROM drive, the connection is not interrupted by various kinds of security-measure programs being installed on PC 2. Auto-run program 54 contains projector identifier 54a for identifying a wireless projector to be wirelessly connected. The identifier includes the model number, serial number, and manufacturer information of a projector.

When wireless LAN adaptor 5 is connected to a USB terminal of PC 2, control unit 52 transmits the identifier for a CD-ROM drive in identifier 53 to PC 2.

Auto-run program 54 includes wireless settings and communication software (usually referred to as wireless manager) for wirelessly connecting PC 2 to wireless projector 1. When wireless LAN adaptor 5 is connected to a USB terminal of PC 2, control unit 52 loads auto-run program 54 into RAM 23 of PC 2, and then the program is automatically executed. Here, identifier 53 and auto-run program 54 are actually stored in such as a ROM in control unit 52 and a flash memory (not shown).

Wireless LAN_IF 55 wirelessly transmits TCP/IP data from control unit 52 to wireless projector 1.

Wireless projector 1 is composed of wireless LAN_IF 11 wirelessly communicating with wireless LAN adaptor 5; image generating unit 12 generating an image from TCP/IP data received by wireless LAN_IF 11; LCD (liquid crystal display) panel 13; light source 14; and projection lens 15 magnifying and projecting an image produced by modulating light from light source 14 through LCD panel 13.

Figure 3:
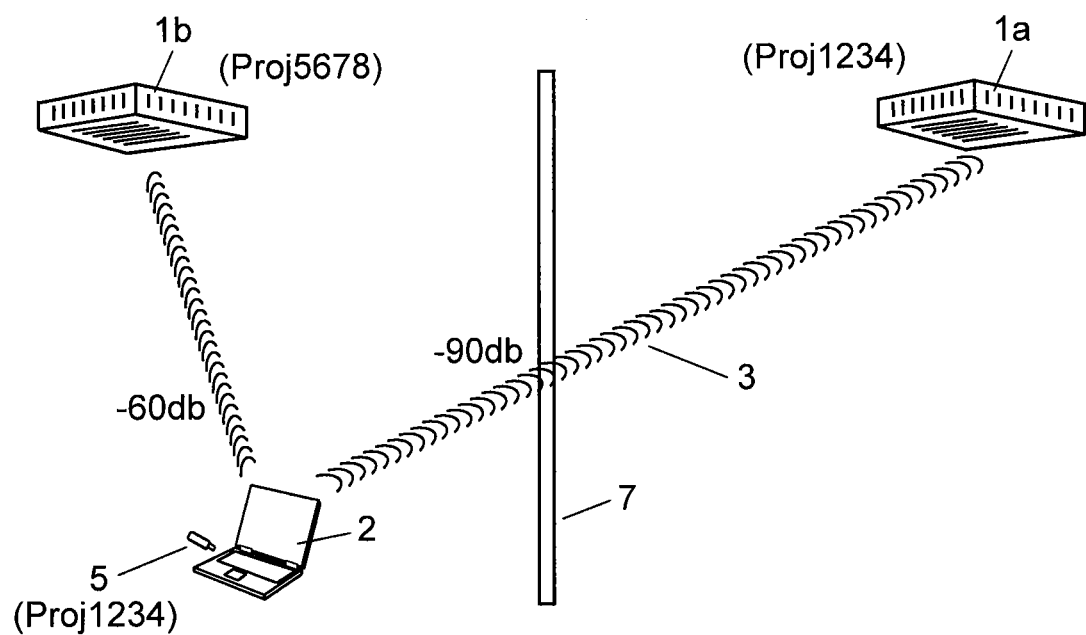
FIG. 3 shows an installation example of a wireless projector apparatus according to the first exemplary embodiment of the present invention.
Figure 4:
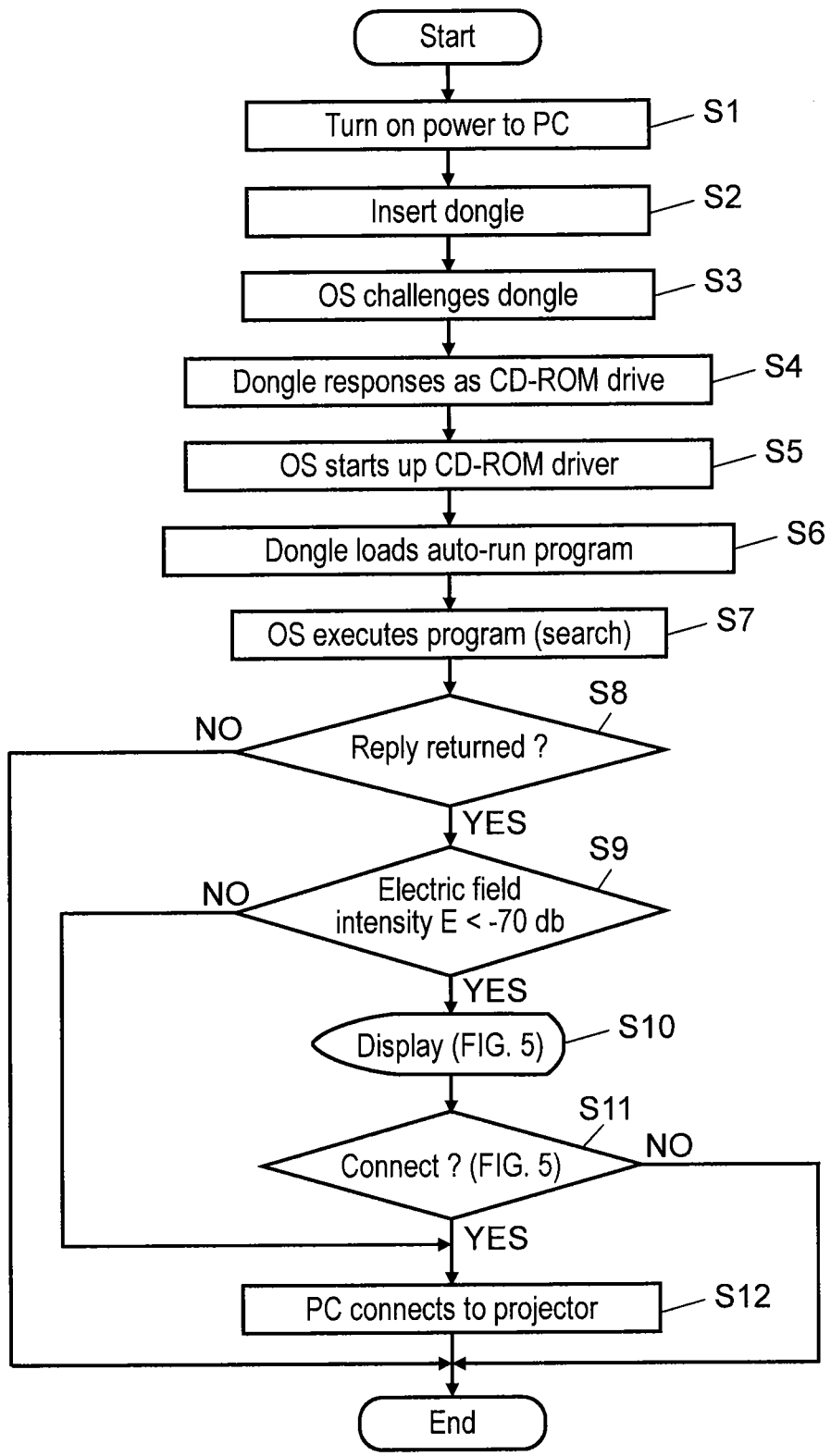
FIG. 4 is a flowchart for illustrating operation of the wireless projector apparatus.
Figure 5:
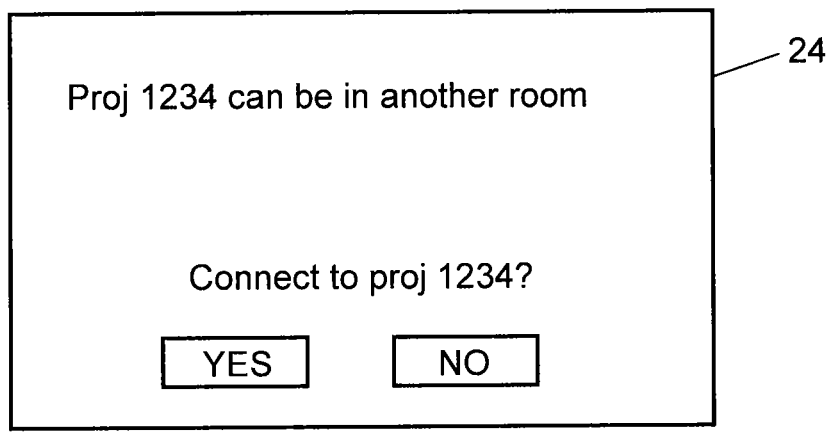
FIG. 5 shows an example guidance displayed on the screen of the information-processing apparatus.

Next, a description is made of operation of the wireless projector apparatus of the embodiment using FIG. 4 with reference to FIGS. 2, 3, and 5. Here, the description is made assuming that the power to wireless projector 1 is always turned on. To simplify the description below, PC 2 in FIG. 2 may be referred to simply as a PC; wireless LAN adaptor 5, simply as a dongle or a USB dongle.

FIG. 3 shows an installation example of the wireless projector apparatus according to the embodiment. FIG. 4 is a flowchart for illustrating operation of the wireless projector apparatus. FIG. 5 shows an example guidance displayed on the screen of PC 2 (information-processing apparatus).

First, FIG. 3 is described. The figure shows a state where wireless projector 1a and wireless projector 1b are installed with wall 7 placed therebetween, and dongle 5 for wireless projector 1a is connected to PC 2. An attempt of automatic connection in this state causes the intensity of both radio waves to be attenuated due to wall 7, and causes PC 2 to be inconveniently connected to wireless projector 1a. Operation for avoiding this inconvenient connection is described using FIG. 4.

In step S1, the power to PC 2 is turned on. In step S2, when dongle 5 is connected (inserted) to a USB terminal of PC 2, the OS (operating system) monitoring USB terminals senses this connection. In step S3, the device of dongle 5 is challenged. In response to this operation, dongle 5 transmits the content of identifier 53 to the OS of PC 2 in step S4. That is, dongle 5 replies as a CD-ROM drive. Having received the reply, the OS searches its own files for the driver software of the drive in step S5. A regular PC has driver software for a CD-ROM drive installed therein, and thus the driver software is started up. Next in step S6, the file of auto-run program 54 is loaded into PC 2 and is developed on RAM 23 of PC 2. In next step S7, the wireless manager is started up to start connection operation. That is, dongle 5 emits radio waves to go around searching all the networks wirelessly connected for a projector with identifier 54a.

In response to this operation, if a reply is made from wireless projector 1a ("Yes") in step S8, electric field intensity measuring unit 56 of dongle 5 measures the electric field intensity of a response radio wave, and control unit 52 determines whether the intensity is smaller than a predetermined value (e.g. −70 db) in step S9. As shown in FIG. 3, if the electric field intensity of a response radio wave from wireless projector 1a is −90 db for example, electric field intensity E is smaller than the above-described predetermined value (−70 db) ("Yes" in step S9). Thus in next step S10, control unit 52 directs PC 2 to display the guidance shown in FIG. 5 on display 24. The user views this guidance to learn that dongle 5 is not for wireless projector 1b (proj 5678) in the room where PC 2 is placed. In step S11, selecting button "No" shown in FIG. 5 makes connection operation to be stopped to prevent PC 2 from connecting to wireless projector 1a in the other (next) room.

This completes the operation of avoiding unintended connection. Next, a description is made of operation for connecting PC 2.

If dongle 5 in FIG. 3 is for wireless projector 1b (proj 5678) in the same room, the electric field intensity of a response radio wave from wireless projector 1b is −60 db for example as shown in FIG. 3, electric field intensity E is larger than the above-described predetermined value (−70 db) ("No" in step S9). Thus the process flow jumps to step S12, and PC 2 is connected to wireless projector 1b.

In step S11, selecting button "Yes" shown in FIG. 5 also allows PC 2 equipped with dongle 5 for proj 1234 to connect to wireless projector 1a. This operation corresponds to a case where wireless projector 1a is not installed with wall 7 placed between projector 1a and PC 2 as shown in FIG. 3, but installed in a large room such as a gymnasium and hall, and the distance between wireless projector 1a and PC 2 is long.

As described hereinbefore, the wireless projector apparatus of this embodiment makes wireless LAN adaptor 5 (accessory) record unique identification information; and contains an auto-run program (wireless manager) that makes the PC connect to a wireless projector having the unique identifier information when wireless LAN adaptor 5 is connected to the PC. Further, the wireless projector measures the electric field intensity of a response radio wave from the wireless projector having the above-described unique identifier, and when this electric field intensity is smaller than a predetermined value, interrupts the connection process and makes the display unit of the PC produce a display for requesting judgement whether or not connection is made.

Here, in the above-described embodiment, unique identification information for identifying wireless projector 1 is a projector identifier; however, any other information may be used as long as wireless projector 1 is uniquely specified such as an MAC address and IP address of wireless projector 1.

Second Exemplary Embodiment

Next, a description is made of the second exemplary embodiment of the present invention with reference to the related drawings. The appearance and electrical configuration of a wireless projector apparatus according to the embodiment are the same as those in FIGS. 1 and 2 of the first embodiment, and thus their description is omitted.

Figure 6:
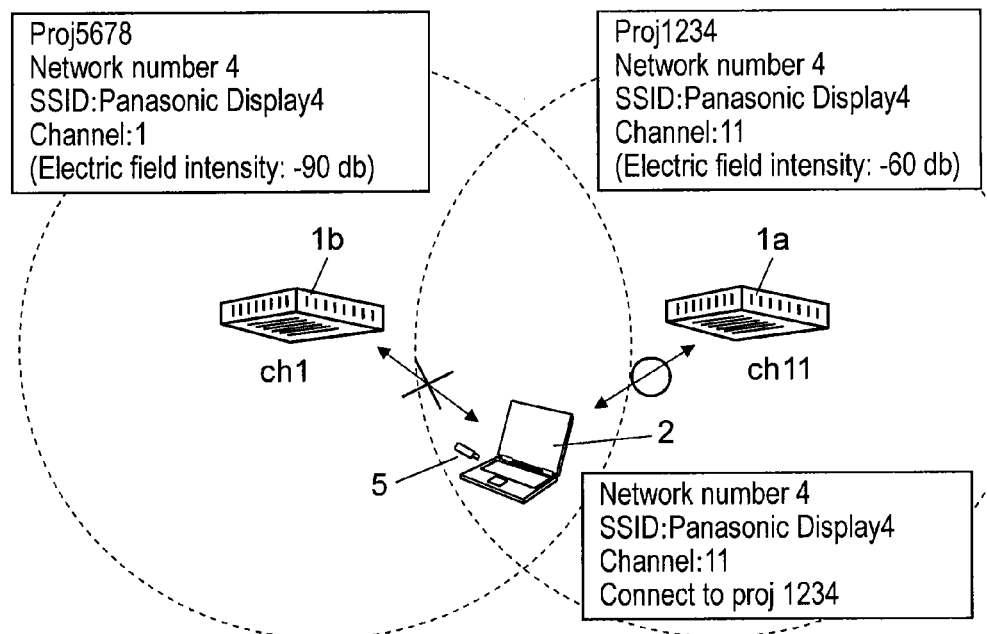
FIG. 6 shows an installation example of a wireless projector apparatus according to the second exemplary embodiment of the present invention.
Figure 7:
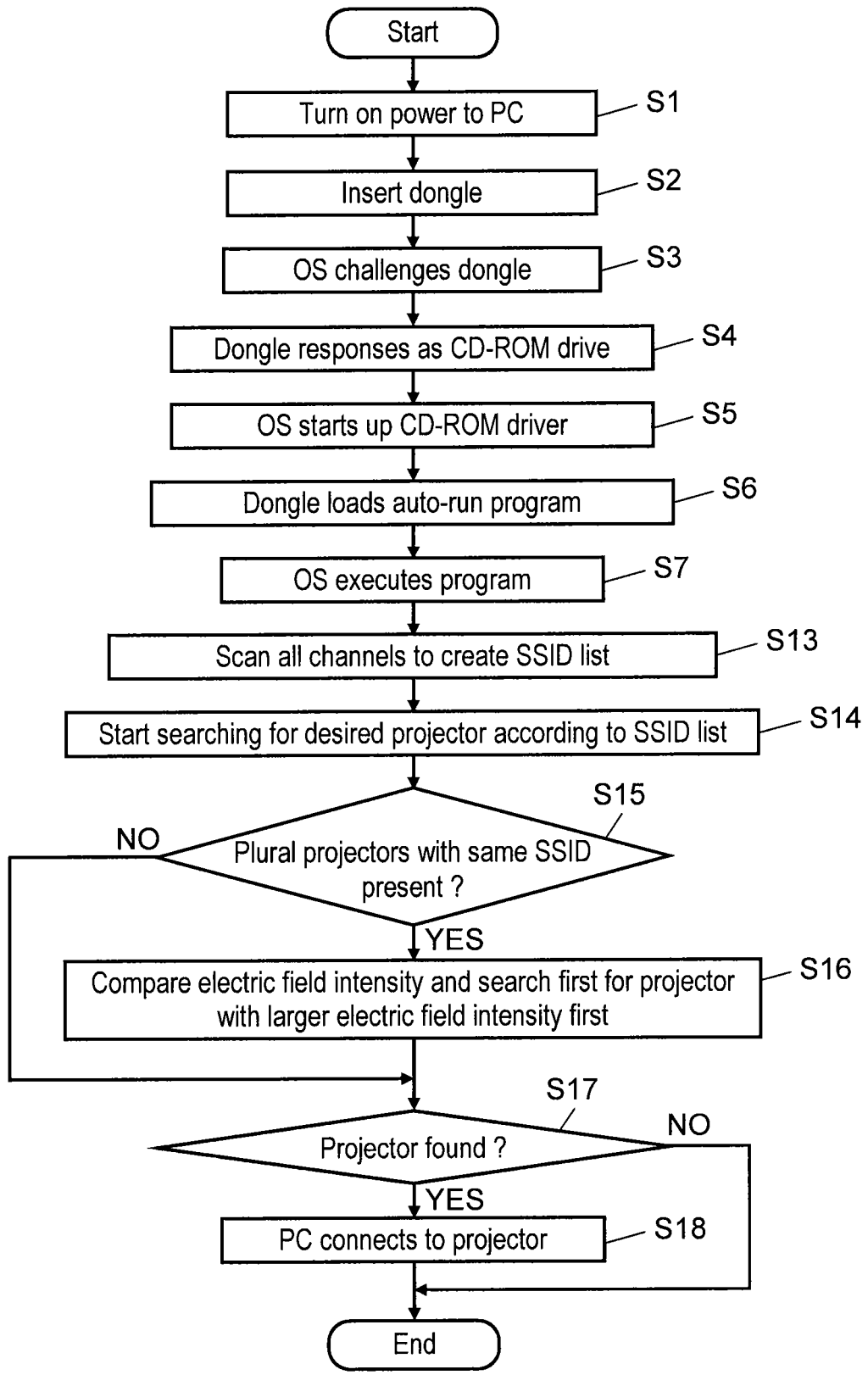
FIG. 7 is a flowchart for illustrating operation of the wireless projector apparatus.

Next, a description is made of operation of the wireless projector apparatus of this embodiment using FIG. 7 with reference to FIGS. 2, 6, and 8. FIG. 6 shows an installation example of the wireless projector apparatus according to the embodiment. FIG. 7 is a flowchart for illustrating operation of the wireless projector apparatus. FIG. 8 shows an example SSID list acquired by PC 2 (information-processing apparatus).

First, FIG. 6 is described. This figure shows a circumstance where wireless projectors 1a and 1b have the same SSID but belong to network groups with different channels (ch 1 and ch 11). More specifically, wireless projector 1a (proj 1234) has the same SSID (Panasonic display 4) set thereto; belongs to a network group with ch 11; and the electric field intensity is −60 db. Meanwhile, wireless projector 1b (proj 5678) belongs to a network group with ch 1; and the electric field intensity is −90 db. Even in this case, PC 2 can detect projector 1a to be connected and connect to projector 1a. This search and connection operation are described using FIG. 7.

In FIG. 7, operations in steps S1 through step S7 are the same as those in FIG. 4 described in the first embodiment, and thus their description is omitted.

First in step S13, the wireless manager scans all the channels (e.g. ch 1 through ch 11) to create an SSID list. As shown in FIG. 8, the SSID list is composed of SSIDs detected, channels of the SSID group, and the electric field intensity. Here, the electric field intensity is obtained by operation in which electric field intensity measuring unit 56 of dongle 5 measures the electric field intensity of a response radio wave.

In step S14, a search starts for a desired wireless projector according to the SSID list created in step S13. In step S15, determination is made whether or not plural wireless projectors with the same SSID are present. If present ("Yes"), control unit 52 communicates with wireless projectors in the descending order of the electric field intensity in next step S16. Then, control unit 52 acquires each ID of the wireless projectors and determines whether or not the ID is the same as that stored in dongle 5.

In step S17, if a desired wireless projector is detected ("Yes"), PC 2 is connected to the wireless projector in step S18 and the process ends. Otherwise ("No"), the process ends without doing anything.

A description is made in more detail of the above operation using FIG. 6. FIG. 6 shows a configuration in which two wireless projectors 1a (proj 1234) and 1b (proj 5678) form network groups with the same SSID (Panasonic display 4) with different channels for PC 2. In other words, wireless projector 1a forms a network group with ch 11; 1b forms with ch 1.

Dongle 5 stores "proj 1234" as the ID of a wireless projector to be connected. When dongle 5 is connected to a USB terminal of PC 2, the SSID list shown in FIG. 8 is created, and two wireless projectors with the same SSID (Panasonic display 4) are identified. The electric field intensity from wireless projector 1a is −60 db, which is larger than that (−90 dB) from wireless projector 1b. Thus, PC 2 communicates with wireless projector 1a first; acquires projector ID (proj 1234); and determines it as a desired one and connects to it.

Here, even if the electric field intensity of a radio wave is not measured, it is possible for a wireless projector apparatus of this embodiment to refer to an SSID list first; to communicate with wireless projector 1b; and next to communicate with wireless projector 1a and to connect to a desired wireless projector. However, as in this embodiment, a desired wireless projector can be detected more quickly for connection by searching for a wireless projector with a larger electric field intensity of a received radio wave.

When two wireless projectors are installed in two adjacent rooms, the projector in the room where PC 2 is present usually has a stronger electric field intensity and is to be detected first. This allows a desired wireless projector to be connected in a minimum of time without spending time for unnecessary search.

As described hereinbefore, the wireless projector apparatus of this embodiment makes wireless LAN adaptor 5 (accessory) record unique identification information; and contains an auto-run program (wireless manager) that makes the PC connect to a wireless projector having the unique identifier information when wireless LAN adaptor 5 is connected to the PC. When the auto-run program starts its execution, the program scans all the channels to search for SSIDs present in a communication range (where a radio wave reaches) of PC 2 and creates an SSID list. On this occasion, the electric field intensity of a response radio wave from the wireless projector may be measured and added to the SSID. After that, the program communicates with wireless projectors present on the SSID list to acquire each ID of the wireless projectors and determines whether or not the ID acquired is the same as that stored in dongle 5. PC 2 connects to a wireless projector according to the determination. A desired projector can be detected more quickly by determining the order for acquiring an ID on the basis of the electric field intensity.

The wireless projector apparatus of this embodiment thus creates an SSID list first and searches for only wireless projectors with SSIDs detected, which enables a desired wireless projector to be detected more quickly compared to a case where a search is made regardless of the presence of an SSID as conventionally performed. Further, even if a network group with the same SSID with different channels is formed, a desired wireless projector can be reliably detected for connection.

In the above embodiment, unique identification information for identifying wireless projector 1 is a projector identifier; however, any other information may be used as long as wireless projector 1 is uniquely specified such as an MAC address and IP address of wireless projector 1.

In the above embodiment, the SSID list is assumed to contain an electric field intensity; otherwise, wireless projectors may be searched for in the order of channel number, for example, using an SSID detected.

INDUSTRIAL APPLICABILITY

The present invention is useful when an information-processing apparatus is connected to a specific wireless projector by connecting a dongle-type wireless LAN adaptor to a USB terminal of the information-processing apparatus.

REFERENCE MARKS IN THE DRAWINGS 1, 1a, 1b Wireless projector
2 Information-processing apparatus (PC)
3 Radio wave
4 Screen
5 Wireless LAN adaptor
6 Operation unit
7 Wall
11 Wireless LAN_IF (to wireless projector)
12 Image generating unit
13 LCD (liquid crystal display) panel
14 Light source
15 Projection lens
21 CPU
22 HDD
23 RAM
24 Display
25 Input device
26 USB_IF (to PC)
51 USB_IF (to wireless LAN adaptor)
52 Control unit
52a Command interpretation unit
52b Data converting unit
53 Identifier
54 Auto-run program (wireless manager)
54a Projector identifier
55 Wireless LAN_IF (to wireless LAN adaptor)
56 Electric field intensity measuring unit

The invention claimed is:

1. A wireless projector apparatus comprising:
   a wireless projector capable of connecting to a wireless network; and
   a wireless LAN adaptor containing identifier information unique to the wireless projector, the wireless LAN adaptor capable of connecting to the wireless projector by being connected to a USB terminal of an information-processing apparatus,
   wherein the wireless LAN adaptor includes:
   an auto-run program making the information-processing apparatus connect to a wireless projector having the unique identifier information when the wireless LAN adaptor is connected to the information-processing apparatus; and
   an electric field intensity measuring unit measuring an electric field intensity of a received radio wave,
   wherein the wireless projector apparatus controls a process of connecting the information-processing apparatus to the wireless projector according to an electric field intensity measured by the electric field intensity measuring unit.

2. The wireless projector apparatus of claim 1,
   wherein the electric field intensity measuring unit measures an electric field intensity of a response radio wave from a wireless projector having the unique identifier,
   wherein a display unit of the information-processing apparatus displays a request to determine whether or not connection is made to a wireless projector having the unique identifier when the electric field intensity is smaller than a predetermined value.

3. The wireless projector apparatus of claim 1,
   wherein the wireless projector apparatus scans all communicatable wireless channels when the wireless LAN adaptor is connected to the information-processing apparatus, and creates an SSID list containing SSIDs belonging to respective wireless channels and an electric field intensity of the received radio wave,
   wherein the wireless projector apparatus searches for a wireless projector having the unique identifier information according to the SSID list.

4. The wireless projector apparatus of claim 3,
   wherein the wireless projector apparatus searches first for a wireless projector belonging to a network group having a wireless channel with a larger electric field intensity of the received radio wave if network groups with a same SSID with different wireless channels are present.

5. A wireless LAN adaptor containing identifier information unique to a wireless projector to be connected, the wireless LAN adaptor capable of connecting to the wireless projector by being connected to a USB terminal of an information-processing apparatus, wherein the wireless LAN adaptor includes:
- an auto-run program making the information-processing apparatus connect to a wireless projector having the unique identifier information when the wireless LAN adaptor is connected to the information-processing apparatus; and
- an electric field intensity measuring unit measuring an electric field intensity of a received radio wave, wherein the wireless LAN adaptor measures an electric field intensity of a response radio wave from the wireless projector having the unique identifier, and a display unit of the information-processing apparatus displays a request to determine whether or not connection is made to a wireless projector having the unique identifier when the electric field intensity is smaller than a predetermined value.

* * * * *